United States Patent [19]

Sugio et al.

[11]  4,293,478
[45]  Oct. 6, 1981

[54] PROCESS FOR PRODUCING POLYPHENYLENE ETHER COMPOSITION CONTAINING INORGANIC PIGMENT

[75] Inventors: Akitoshi Sugio, Ohmiya; Masanobu Masu, Kanamachi; Hiroshi Nakai, Matsudo; Yukio Sasaki, Tokyo, all of Japan

[73] Assignee: Mitsubishi Gas Chemical Co., Inc., Tokyo, Japan

[21] Appl. No.: 81,620

[22] Filed: Oct. 3, 1979

[30] Foreign Application Priority Data

Oct. 4, 1978 [JP] Japan ................................ 53-122436

[51] Int. Cl.$^3$ ............................................. C08L 71/04
[52] U.S. Cl. .............................. 260/37 R; 260/37 M; 525/1; 525/4; 525/132; 525/152; 528/212
[58] Field of Search ............. 260/37 R, 37 M; 525/1, 525/4, 132, 152; 528/212

[56] References Cited

U.S. PATENT DOCUMENTS

| | | | |
|---|---|---|---|
| 3,306,874 | 2/1967 | Hay | 528/212 |
| 3,383,435 | 5/1968 | Cizek | 525/132 |
| 4,011,200 | 3/1977 | Yonemitsu et al. | 525/132 |
| 4,038,343 | 7/1977 | Yonemitsu et al. | 525/132 |

*Primary Examiner*—Morton Foelak
*Attorney, Agent, or Firm*—Wenderoth, Lind & Ponack

[57] ABSTRACT

An improved method for dispersing an inorganic pigment uniformly in polyphenylene ether resins. A polyphenylene ether composition having an inorganic pigment uniformly dispersed therein is obtained by intimately mixing a polyphenylene ether resin and the inorganic pigment in a weight ratio of from 0.5:1 to 2:1 by a high-speed mixer to form a pre-blend, and then mixing the pre-blend intimately with a polyphenylene ether in a conventional mixer such as an extruder. The pre-blend can also be uniformly dispersed in a mixture of the polyphenylene ether with polystyrene, a styrene/butadiene copolymer, a styrene/butadiene/acrylonitrile terpolymer, or a rubber-modified high impact polystyrene.

3 Claims, No Drawings

PROCESS FOR PRODUCING POLYPHENYLENE ETHER COMPOSITION CONTAINING INORGANIC PIGMENT

This invention relates to a process for preparing a thermoplastic resin composition having superior weather resistance composed of a polyphenylene ether alone or a polyphenylene ether and a styrene polymer, and an inorganic pigment.

Polyphenylene ethers are well known as thermoplastic resins having superior physical properties, and are disclosed, for example, in U.S. Pat. No. 3,306,874 and U.S. Pat. No. 4,011,200. Usually, a polyphenylene ether polymer is obtained by polymerizing a substituted phenol oxidatively in the presence of a catalyst, adding a non-solvent to the resulting polymer solution to precipitate the resulting polymer, collecting it by filtration, and drying it. The polyphenylene ether so obtained is usually in the form of a fine powder.

In spite of their superior physical properties, polyphenylene ethers have poor moldability because of their high softening points. Thus, it is the practice to blend these resins with styrene polymers in order to improve their moldability (for example, U.S. Pat. Nos. 3,383,435 and 4,038,343), and as is well known, such polymer blends are in commercial use.

Polyphenylene ethers or mixtures thereof with styrene polymers have low resistance to heat or light, and undergo discoloration or are deteriorated in physical properties upon exposure to high temperatures during melt mixing or to light. To inhibit discoloration and prevent the deterioration of physical properties under light, it is the usual practice to add inorganic pigments. Addition of inorganic pigments, however, should not impair the excellent properties inherently possessed by the polyphenylene ethers. For this reason, pigments used for blending with the resins should desirably have an average particle diameter of less than several tens of microns, especially less than several microns. Since such a fine powder has a strong cohesive force among the particles and is adhesive to other materials, its handling in commercial operations is difficult. Specifically, because the cohesive energy among the particles is strong, a large amount of energy is required to disperse the pigment powder finely in other materials.

According to the prior art, the dispersion of an inorganic pigment is performed by weighing a polyphenylene ether powder, a styrene polymer, the inorganic pigment and other materials, mixing them simultaneously in a blender, and feeding the mixture into an extruder. However, the polyphenylene ether is usually a powder but the styrene polymer is in the form of pellets or beads. Moreover, while the polyphenylene ether have a bulk density of about 0.2 to 0.4, the styrene polymers have a bulk density of about 0.6. The differences in form and bulk density between these polymers make it virtually impossible to uniformly mix the starting materials simultaneously in a large-scale industrial operation, although it may be possible in a laboratory-scale operation. Even if the simultaneous mixing is apparently performed, the ingredients of the resulting mixture may separate from each other during transfer to the extruder and so the composition of the mixture may become non-uniform. This will lead to variations in the quality of the resulting composition and also of fabricated articles prepared therefrom. The simultaneous mixing method also has the defect that a mixer of a large capacity is required.

With the recent development of automatic weighing feeders, a method has been employed which involves feeding the individual materials continuously into a melt-mixing machine to perform melt-blending continuously and automatically. However, the fine particulate inorganic pigment is strongly adhesive and therefore, adheres to movable parts of the weighing feeder to impede the motion of these parts and cause difficulty. Moreover, such an inorganic pigment may block pipes. Accordingly, it is not always easy to melt-blend the polyphenylene ether with the inorganic pigment continuously. Furthermore, because the pigment has a large cohesive energy among the particles, an exceedingly great shearing force will be required if it is desired to disperse the pigment uniformly by using a melt-mixing machine alone. When such a high shearing force is employed, the temperature of the resin rises excessively to deteriorate the resin, and uniform dispersion is difficult to achieve even by such an operation.

If the inorganic pigment is not uniformly dispersed in the resin matrix, color non-uniformity will be caused, and also a deterioration in quality, especially a reduction in impact value, will be caused. Thus, in mixing the inorganic pigment with the polyphenylene ether or the polyphenylene ether/styrene polymer mixture, one important problem is how to disperse the inorganic pigment uniformly in the resin matrix. Thus, the conventional simultaneous mixing method and the melt blending method cannot produce entirely satisfactory results.

It is an object of this invention therefore to provide a method for easily dispersing an inorganic pigment uniformly in a resin matrix of a polyphenylene ether alone or a polyphenylene ether and a styrene polymer.

The present inventors made extensive investigations in order to achieve the object of this invention, and found that a fine powder of an inorganic pigment can be very easily dispersed in a resin matrix of a polyphenylene ether alone or a polyphenylene ether and a styrene polymer by pre-blending a polyphenylene ether and the inorganic pigment in a weight ratio of from 0.5:1 to 2:1, and mixing the resulting pre-blend with the polyphenylene ether alone or the polyphenylene ether and the styrene polymer.

The present invention provides, in a method for preparing a resin composition composed of a polyphenylene ether alone or a polyphenylene ether and a styrene polymer and an inorganic pigment, the improvement which comprises intimately mixing the polyphenylene ether and the inorganic pigment in a weight ratio of from 0.5:1 to 2:1 by a high-speed mixer to form a pre-blend, and admixing the pre-blend intimately with the polyphenylene ether alone or the polyphenylene ether and the styrene polymer.

Surprisingly, it has been found that by using the pre-blend obtained by a high-speed mixer, the inorganic pigment can be uniformly dispersed in the resin matrix substantially by using only a melt-extruder. Then, by feeding the pre-blend and the polyphenylene ether or the polyphenylene ether and the styrene polymer into a hopper of an extruder in predetermined proportions without mixing, the desired resin composition of this invention can be obtained. Thus, the present invention provides a method for producing a polyphenylene ether resin composition having an inorganic pigment uniformly dispersed therein continuously and automatically. The resulting resin composition has a very constant and uniform quality, and can be used as a commercially feasible molding material.

The polyphenylene ethers used in this invention generically denote polymers having a structural unit of the following formula in the skeleton.

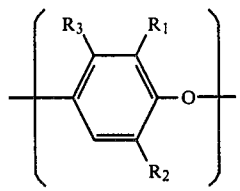

wherein $R_1$ and $R_2$ represent a lower alkyl group, and $R_3$ represents a hydrogen atom or a lower alkyl group.

The polyphenylene ether may be a homopolymer composed of one kind of the above structural unit, or a copolymer composed of two or more kinds of the above structural unit. The polymer should have a degree of polymerization, i.e. the number of the structural units bonded, of at least 80.

Specific examples of the polyphenylene ethers are homopolymers such as poly(2,6-dimethyl-1,4-phenylene ether) and poly(2-methyl-6-ethyl-1,4-phenylene ether), and copolymers such as a random copolymer of 2,6-dimethylphenol and 2,3,6-ttrimethylphenol or a random copolymer of 2-methyl-6-ethylphenol and 2,3,6-trimethylphenol. From the standpoint of performance and/or versatility, poly(2,6-dimethyl-1,4-phenylene ether) and the random copolymer of 2,6-dimethylphenol and 2,3,6 trimethylphenol are used especially preferably. The copolymer is derived from a phenol mixture containing 50 to 98 mole% of 2,6-dimethylphenol. An especially preferred random copolymer is derived from 2,6-dimethylphenol and 2,3,6-trimethylphenol in a mole ratio of 95:5.

The styrene polymer to be used in combination with the polyphenylene ether denotes a polymer containing at least 25%, based on its entire weight, of a structural unit derived from styrene or its derivatives. It includes, for example, not only a homopolymer of styrene, but also copolymers of styrenes and conjugated dienes, terpolymers of styrenes, conjugated dienes and acrylonitrile, and resins generically referred to as rubber-modified high impact polystyrene. Any of the styrene polymers can be used which are already known to be blendable with the polyphenylene ethers. The rubber-modified high impact polystyrene and the homopolymer of styrene are especially preferred. The proportion of the styrene polymer to be mixed with the polyphenylene ether is not particularly restricted. However, to avoid any deleterious effect on the inherent properties of the polyphenylene ethers, the proportion of the polyphenylene ether should be at least 30% based on the sum of these two resins.

The polyphenylene ethers and the mixtures thereof with the styrene polymers used in the method of this invention are described in detail in the above-cited U.S. Pat. Nos. 3,383,435 and 4,038,343.

The inorganic pigment to be incorporated by the method of this invention is selected from the group consisting of titanium dioxide, zinc oxide, calcium carbonate and talc. If desired, two or more of these compounds may be used in combination. Titanium dioxide is conveniently used from the standpoint of the performance of the resin composition obtained. of the polyphenylene ether and the inorganic pigment is first prepared by using a high-speed mixer. Desirably, the high-speed mixer is operated in such a manner that the linear speed of the tips of the stirring impeller is 5 to 50 m/sec, preferably 10 to 30 m/sec. At lower speeds, a long period of time would be required to overcome the cohesive energy of the pigment among the particles and disperse them uniformly.

In the preparation of the pre-blend, the mixing weight ratio of the polyphenylene ether to the inorganic pigment is chosen within the range of from 0.5:1 to 2:1, preferably from 1:1 to 1.5:1. The ratio of 1:1 is especially preferred. If the ratio is less than 0.5:1, the powder properties of the inorganic pigment cannot be improved.

The pre-blend obtained is then mixed intimately with the polyphenylene ether alone or the polyphenylene ether and the styrene polymer. The mixing can be performed conveniently by the aforesaid simultaneous blending method or melt-blending method. If desired, it is possible to add the pre-blend to the polyphenylene ether alone or the polyphenylene ether and the styrene polymer so that the content of the inorganic pigment in the finally obtained resin composition is 0.1 to 10% by weight based on the weight of the entire composition.

If desired, a rubber component and/or a flame retardant may be added in the preparation of the inorganic pigment-containing resin composition of this invention. Other additives such as stabilizers, lubricants or coloring agents may be incorporated together with the inorganic pigment in the pre-blend. Desirably, the total amount of the other additives should not exceed one-fourth of the amount of the inorganic pigment in the pre-blend.

The following Examples and Comparative Examples illustrate the present invention more specifically.

EXAMPLE 1

Powdery poly(2,6-dimethyl-1,4-phenylene ether) having a bulk density of 0.32, and an intrinsic viscosity, measured in chloroform at 25° C., of 0.52 dl/gr and rutile titanium oxide having a bulk density of 0.67 and an average particle diameter of about 0.3 micron in a weight ratio of 1:1 were put into a 20-liter Henschel mixer, and mixed for 5 minutes while the linear speed of the tip of the impellers was maintained at 20 m/sec. Thus, a pre-blend of the polyphenylene ether and titanium oxide in a weight ratio of 1:1 was obtained. The powder properties of the pre-blend were measured by an apparatus for overall measuring of powder properties (made by Hosokawa Iron Works, Ltd.)

The results are shown in Table 1 together with the results obtained with titanium oxide alone.

TABLE 1

| | Titanium oxide | | Pre-blend of Example 1 | |
|---|---|---|---|---|
| Aerated bulk density | 0.67 | | 0.57 | |
| Packed bulk density | 1.10 | | 0.76 | |
| Compressibility (%) | 39 | | 25 | |
| Index | | 2 | | 15 |
| Angle of repose (degrees) | 39 | | 41 | |
| Index | | 18 | | 17 |
| Angle of Spatula (degrees) | 65 | | 59 | |
| Index | | 12 | | 16 |
| Cohesion (%) | 78 | | 52 | |
| Index | | 2 | | 7 |

TABLE 1-continued

| | Titanium oxide | Pre-blend of Example 1 |
|---|---|---|
| Total of the flowability indices | 34 | 55 |

The powder properties shown in Table 1 were measured in accordance with the methods described in Chemical Eng. (Jan. 18th), pp. 163–168 (1965), and have the following meanings.

Compressibility

This is calculated from the aerated bulk density and the packed bulk density. Smaller degrees show better flowability.

Angle of repose

The angle of repose is the angle between the horizontal and the slope of a heap of soil dropped from some elevation. Smaller angles show better flowability.

Angle of spatula

This denotes the angle of a powder which is accumulated on a spatula. Smaller angles show better flowability.

Cohesion

The sample is vibrated on a standard sieve for a predetermined period of time with a predetermined strength. The degree of cohesion is determined from the amount of the sample which has passed through the sieve. Larger degrees of cohesion show lower flowability.

Total of the flowability indices

To perform an overall evaluation of flowability, the results of the individual measuring items are expressed by indices, and the total of the indices is used to evaluate flowability. A larger total value show better flowability.

As is seen from Table 1, the pre-blend of this invention is markedly improved in cohesion, and thus its flowability is improved over the case of titanium oxide alone.

EXAMPLE 2

25 Kg of a powder of a random copolymer of 2,6-dimethylphenol and 2,3,6-trimethylphenol having an aerated bulk density of 0.4 and an intrinsic viscosity, measured at 25° C. in chloroform, of 0.53 dl/gr (obtained by using 95 mole% of 2,6-dimethylphenol monomer and 5 mole% of 2,3,6-trimethylphenol monomer; to be referred to as the phenylene ether copolymer) and 25 kg of a powder of rutile titanium dioxide having an aerated bulk density of 0.67 and an average particle diameter of about 0.3 micron were put into a 150-liter Henschel mixer and mixed for 5 minutes at a speed of 360 rpm (the linear speed of the tip of the stirring impeller of 10 m/second) to form a uniform pre-blend of the phenylene ether copolymer and titanium dioxide in a weight ratio of 1:1.

The same phenylene ether copolymer powder as used in the preparation of the pre-blend, rubber-modified high impact polystyrene pellets and the pre-blend were continuously and simultaneously fed into a twin-screw extruder through an automatic weighing feeder at a rate of 54 kg/hour, 60 kg/hour, and 12 kg/hour respectively, and melted, mixed and extruded. The extruded strand was cooled in water, and formed into pellets by a pelletizer. During this operation, the pre-blend was prepared about every four hours.

To examine variations in the quality of the resulting composition owing to variations in the constituent proportions during the production of pellets, the pellets were sampled for 1 minute at the end of every 15 minutes, and the melt flow value of the pellets was measured by a Koka-type flow tester. The standard deviation of the melt flow value was 7%.

The pellets produced were dried, and molded by an injection molding machine to produce test pieces. The properties of the test pieces were measured, and the results are shown in Table 2.

TABLE 2

| Heat distortion temperature (load = 264 p.s.i.) | 136° C. |
|---|---|
| Izod impact strength (⅛ inch; notched) | 8.7 kg . cm/cm |
| Tensile strength | 637 kg/cm$^2$ |
| Elongation | 37% |

Comparative Example 1

The same phenylene ether copolymer as used in Example 2, rubber-modified high impact polystyrene and rutile titanium dioxide were put into a 150-liter Henschel mixer in an amount of 25 kg, 25 kg and 2.5 kg, respectively, and mixed for 5 minutes at 360 rpm (the speed of the tip of the impeller 10 m/sec). The mixture was fed at a rate of 126 kg/hour through a screw feeder into a twin-screw extruder, and melted, mixed and extruded. The extruded strand was cooled in water and pelletized by a pelletizer. During this operation, the mixture had to be prepared every about 25 minutes.

During the production of the pellets, the pellets were sampled for 1 minute at the end of every 15 minutes, and the melt flow value of the pellets was measured by a Koka-type flow tester. The standard deviation of the melt flow value was 20%.

The resulting pellets were dried and molded by an injection molding machine to prepare test pieces. The properties of the test pieces were measured, and the results are shown in Table 3.

TABLE 3

| Heat distortion temperature (load 264 p.s.i.) | 136° C. |
|---|---|
| Izod impact strength (⅛ inch; notched) | 8.0 kg . cm/cm |
| Tensile strength | 630 kg/cm$^2$ |
| Elongation | 30% |

EXAMPLE 3

25 Kg of a phenylene ether copolymer (derived from 5 mole% of 2,3,6-trimethylphenol and 95 mole% of 2,6-dimethylphenol) having an aerated bulk density of 0.4 and an intrinsic viscosity, measured in chloroform at 25° C., of 0.52 dl/gr, 20 kg of the same titanium dioxide as used in Example 1, 4 kg of a stabilizer and 0.12 kg of a coloring agent, Diaresin Blue G were put into a 150 liter Henschel mixer, and mixed for 3 minutes at a speed of 720 rpm (the linear speed of the tip of the impeller 20 m/sec) to form a homogenous pre-blend. The pre-blend, the same phenylene ether copolymer as above, rubber-modified high impact polystyrene, high styrene rubber (HSR) (a melt mixed extrudate of A-B-A type styrene/butadiene tele-block copolymer and rubber-modified high impact polystyrene in a weight ratio of 1:1 as pellets), and triphenyl phosphate were continuously and simultaneously fed into a twin-screw extruder at a rate of 14.736 kg/hour, 64.5 kg/hour, 42 kg/hour, 6 kg/hour, and 7.2 kg/hour, and melted, mixed, and extruded. The extruded strand was cooled in water, and pelletized by a pelletizer.

The standard deviation of the melt flow value of the pellets sampled at predetermined times was 6.4%. The resulting pellets were bluish white and of uniform quality without color uniformity.

The pellets were dried, and molded by an injection molding machine to form test pieces. The properties of the test pieces were measured. The results are shown in Table 4.

TABLE 4

| Heat distortion temperature (load 264 p.s.i.) | 119° C. |
|---|---|
| Izod impact value (notched, ⅛ inch) | 23 kg . cm/cm |
| Tensile strength | 600 kg/cm² |
| Elongation | 40% |
| Melt flow value (*) | $4.0 \times 10^{-3}$ cc/sec. |

(*) Measured by a Koka-type flow tester at 230° C. under a load of 60 kg using a nozzle having a diameter of 1 mm and a length of 2mm.

EXAMPLE 4 and Comparative Example 2

4 kg of the same poly(2,6-dimethyl-1,4-phenylene ether) as used in Example 1 and 2 kg of lime stone powder having an average particle diameter of 2.7 microns and a bulk density of 0.57 were mixed for 3 minutes in a 20-liter Henschel mixer while maintaining the linear speed of the tip of the impeller at 20 meters/sec. to form a pre-blend composed of the polyphenylene ether and lime stone powder in a weight ratio of 2:1.

The pre-blend, the same polyphenylene ether as above and triphenyl phosphate were fed into a twin-screw extruder at a rate of 3.6 kg/hour, 1.6 kg/hour and 0.5 kg/hour, respectively, through an automatic weighing feeder, and melted, mixed and extruded. The extrudate was pelletized by a pelletizer. The pellets were molded to form test pieces. The properties of the test pieces were measured, and the results are shown in Table 5.

TABLE 5

|  | Example 4 | Comparative Example 2 |
|---|---|---|
| Heat distortion temperature (load 264 p.s.i.) | 160° C. | 158° C. |
| Tensile strength | 680 kg/cm² | 650 kg/cm² |
| Flexural strength | 1150 kg/cm² | 1100 kg/cm² |
| Izod impact strength (notched; ⅛ inch) | 3.5 kg . cm/cm | 1.2 kg/cm/cm |

For comparison, 4 kg of the same polyphenylene ether as above, 1.2 kg of lime stone powder and 0.5 kg of triphenyl phosphate were mixed for 1 hour in a V blender. The mixture was melted and kneaded in an extruder to obtain pellets. Test pieces were prepared from the pellets, and their properties were measured. The results are also shown in Table 5.

What is claimed is:

1. In a method for preparing a resin composition composed of a polyphenylene ether alone or a polyphenylene ether and a styrene polymer, and an inorganic pigment, the improvement which comprises intimately mixing the polyphenylene ether and the inorganic pigment in a weight ratio of from 0.5:1 to 2:1 by a high-speed mixer wherein the linear speed of the tips of the stirring impellers is maintained at 5 to 50 m/sec to form a pre-blend, and admixing in an extruder the pre-blend intimately with the polyphenylene ether alone or the polyphenylene ether and the styrene polymer.

2. The method of claim 1 wherein said inorganic pigment is at least one member selected from the group consisting of titanium dioxide, zinc oxide, calcium carbonate and talc.

3. The method of claim 1 wherein said pre-blend is added to the polyphenylene ether alone or the polyphenylene ether and the styrene polymer so that the content of the inorganic pigment in the finally obtained resin composition is 0.1 to 10% by weight based on the weight of the entire composition.

* * * * *